May 22, 1923.

E. MEITNER

RANGE CLOCK

Filed July 16, 1915

INVENTOR.
ELMER MEITNER
BY Herbert H. Thompson
ATTORNEY.

May 22, 1923.  
E. MEITNER  
RANGE CLOCK  
Filed July 16, 1915    4 Sheets-Sheet 3

INVENTOR.  
ELEMER MEITNER  
BY Herbert H. Thompson  
ATTORNEY.

Patented May 22, 1923.

1,455,799

UNITED STATES PATENT OFFICE.

ELEMER MEITNER, OF BROOKLYN, NEW YORK, ASSIGNOR, BY MESNE ASSIGNMENTS, TO FORD INSTRUMENT COMPANY, INCORPORATED, OF NEW YORK, N. Y., A CORPORATION OF NEW YORK.

RANGE CLOCK.

Application filed July 16, 1915. Serial No. 40,235.

*To all whom it may concern:*

Be it known that I, Dr. ELEMER MEITNER, subject of the King of Hungary, residing at Brooklyn, county of Kings, State of New York, have invented certain new and useful Improvements in Range Clocks, of which the following is a specification.

This invention relates to range predicting and indicating apparatus for automatically indicating the variations of range between a gun and its target, so that the gunners may have constantly before them the correct range.

The objects of this invention are to construct a new and improved complete system for mechanically ascertaining from the data that is readily obtainable on the average war ship the average rate of change of the range, and for automatically transmitting such range to an instrument which I term the range clock, which compounds said rate of change with the initial range so as to show either or both the probable range at each progressive instant and the probable predicted range a predetermined interval ahead of the present time.

According to this invention, use may be made of an instrument designed to record on a chart the courses of both the ship and the target, such as the battle tracer shown in the copending application of H. C. Ford, Ser. No. 855,032, filed August 4, 1914, but the plotting may be done on a drawing board, or otherwise, if desired. Means are provided whereby the relative directions of the two ships and their speeds may be readily determined from the chart and these values mechanically combined and introduced into the range clock. Preferably also I provide automatic means in the range clock for transmitting any one or all of its readings to the gun turrets.

More generally speaking, my invention contemplates the use of four quantities or functions of a relatively moving ship and target, in order to find the fifth quantity or function.

The five quantities in question are: speed of the ship; course of the ship with respect to the target bearing line; speed of the target; course of the target with respect to the same line; and rate of change of range. Any four of these quantities may be introduced into my apparatus to obtain the fifth; but normally, as the title of the invention indicates, the speed and course factors of both ship and target are introduced, and the rate of change of range is calculated therefrom.

Referring to the drawings in which what I now consider to be the preferred form of my invention is shown.

Figures 3, 4, 5:
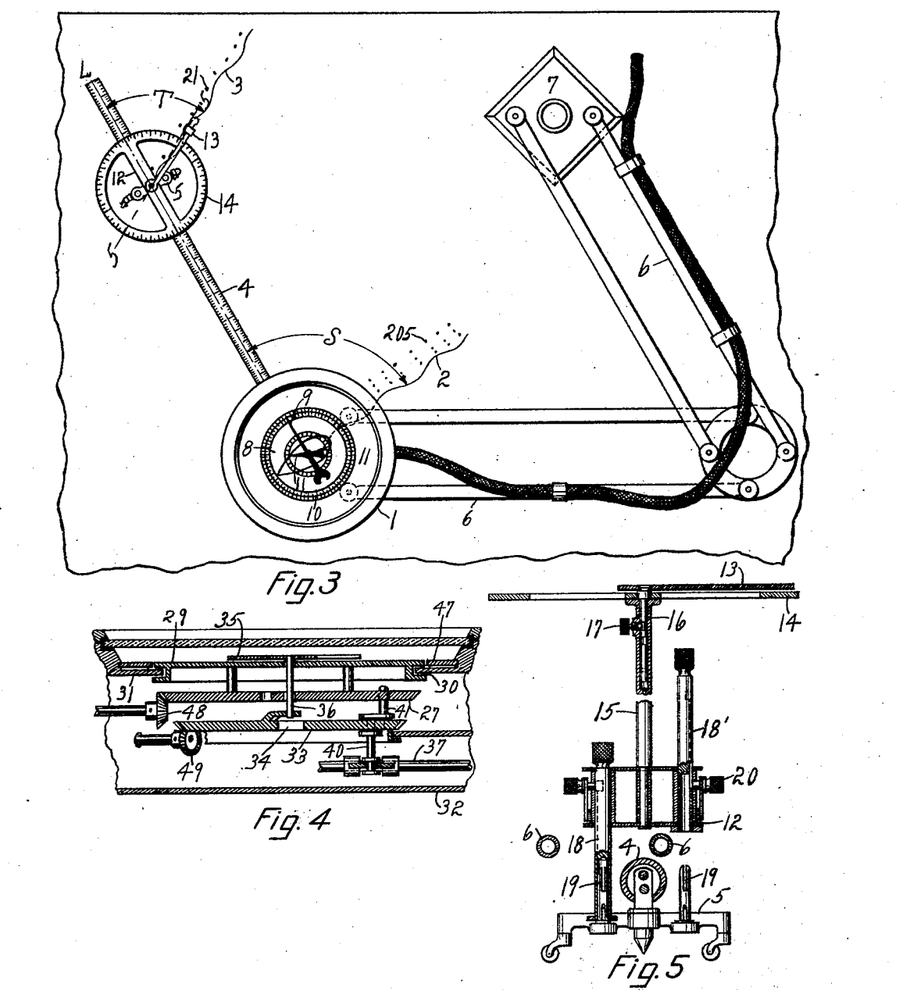
Fig. 3 is a plan view of the form of battle tracer which I prefer to use, showing a novel attachment applied thereto.
Fig. 4 is a section on line 4—4 of Fig. 2.
Fig. 5 is an enlarged section on line 5—5 of Fig. 3.

The battle tracer shown in Fig. 3 is of the type shown in said application of H. C. Ford, and consists, in brief, of an instrument 1 adapted to propel itself over a chart in an equivalent direction and at a speed proportional to that of the ship and to trace on the chart both the ship's course 2 and the target's course 3. For the latter purpose a radial arm 4 is provided on which is mounted a slidable carriage 5. A system of parallel linkage 6 is provided so that the instrument 1 may maintain a sense of direction, the member 7 being held fixed while the tracer is operating. Indicators are provided on the top of the instrument to show, as far as possible, exactly what the tracer is doing. Thus a dial 8 shows the instantaneous heading of the ship, and a pointer 9 shows the target bearing angle, both with respect to the heading of the ship when read on dial 8 and in azimuth when read on scale 10. A speed indicator 11 may also be provided if desired.

For indicating similar functions of the target's course, I prefer to equip the carriage 5 with a novel attachment 12, which comprises essentially a reference index 13 and a scale or protractor 14, the former in this instance being adjustable and being designed to be turned by hand so as to coincide in direction with the general contour of line 3. Scale 14 is mounted on a hollow post 15 in which the stem 16 of index 13 is rotatably mounted. A set screw 17 may be provided to clamp the index in any desired position and to furnish a bearing for stem 16. A plurality of legs 18, 18' may be provided for post 15. Each leg is adapted to detachably engage a spring stud 19 fixed on carriage 5, the idea being that if the carriage 5 crosses under links 6, as shown in Fig. 5, that first one leg and then the other may be raised by releasing spring-pressed pins 20, and thus allow free passage without interfering with the adjustment of the protractor.

For obtaining the speed of the target, any suitable measuring device may be employed for measuring a predetermined portion of the traced line 3. By knowing the scale of the chart and by observing the number of periodic time dots 21, a ready indication of the speed may be obtained.

The data thus obtained is introduced into the range clock proper by suitable setting handles which serve to actuate indicators of speed and direction. The general method employed is to combine the speed of both the ship and the target with a function of the angle (S, T) subtended by their respective courses with the target bearing line L, and finally to combine the two results. The theory is in brief as follows:

Roughly speaking the change of range that takes place during a given interval is represented by the amount that the two ships approach or recede from each other along the target bearing line L. If a given portion of the traced course of each ship is resolved in the direction of the target bearing line and the two values subtracted, an indication of the rate of change of range will be had. I prefer to employ a calculator such as shown in Figs. 2 and 4 for the course and angle of both the ship and the target, and obtain the rate of change of range by combining, by differential means such as described hereinafter in connection with the preferred form of my invention, the result obtained by the two machines.

Figure 2:
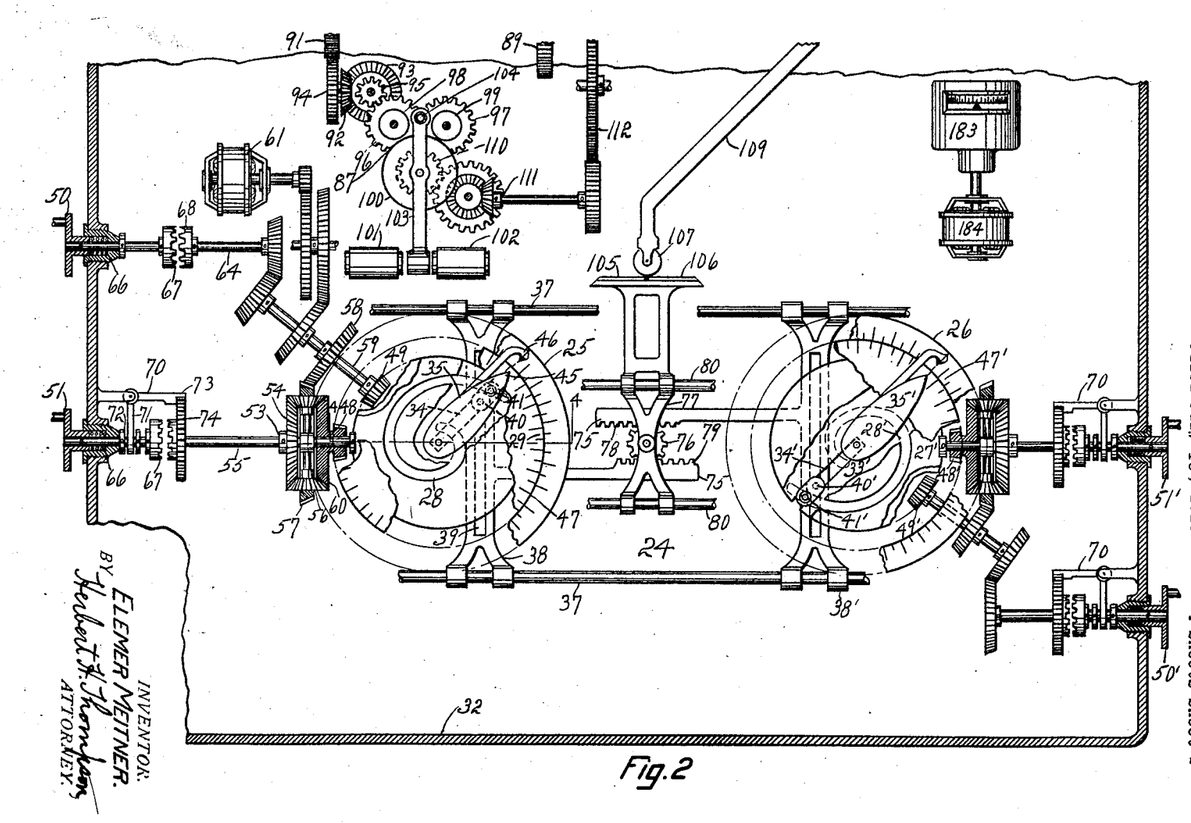
Fig. 2 is a similar view of another portion of the range clock.
Figure 8:
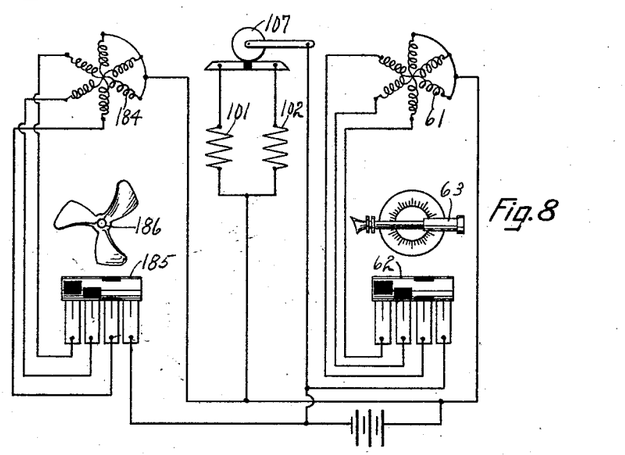
Fig. 8 is an elementary wiring diagram of the range clock and connected parts.

I prefer, however, to employ the type of computer shown in Fig. 2 and to place said computer directly within the range clock proper. In this instance the computer 24 comprises a pair of indicators 25 and 26, the former being adapted to be set to show both the speed and target bearing angle of the ship, while the latter is adapted to show similar functions of the target. Multiplying mechanism is associated with each indicator. A member 27 provided with a cam slot 28 is rotatably mounted within the casing 32 by being secured to dial 29, which has a peripheral slot 30 adapted to take over fixed flanges 31 extending from casing 32. A second member 33 is rotatably mounted below but concentric with member 27 and is provided with a radial slot 34. Member 33 also carries a pointer 35 by means of stem 36, which reads on both dial 29 and fixed scale 47. A fixed, laterally extending slideway 37 and a slide 38 with a longitudinal slot 39 are positioned under said members so that the slide receives motion from a pin or pins which also engage slots 28 and 34. Preferably two offset pins 40 and 41 are provided and the slot 28 laid out so as not to reach the exact center of member 27 in order that there may be no likelihood of the pins reaching a dead center. Member 33 is designed to be set in a position corresponding to angle S, while member 27 is set to correspond to the speed of the ship so that the position of the pins in slot 34 is governed according to the speed of the ship, while the position of the slot is governed according to the magnitude of angle S. The two members are set according to the indications of the compound pointer 35. The inner index 45 of said pointer when read on dial 29 shows the speed of the ship while the outer index 46 is read on fixed scale 47 and shows the target bearing angle. In order to set the dial and pointer, the members 27 and 33 are preferably made in the form of bevel gears, a bevel pinion 48 serving to drive gear 27 and a pinion 49 meshing with gear 33. Between the pinions and the setting handles 50 and 51 I provide a means for causing dial 29 and pointer 35 to move together when the setting handle 50 for the angle is turned but which allows at the same time pointer 35 to move alone when setting handle 51 for the speed is turned. Some such arrangement is necessary in the type of computer shown since when turning member 33 to change the angular indication, it is evident that the position of the pin 40 in slot 34 should not be varied by relative displacement of members 33 and 27. For accomplishing this result I have shown a differential bevel train 53 placed between pinion 48 and handle 51. Gear 54 of said train is fixed to shaft 55, while the planetary arm 56 is free to revolve and is provided with a bevel gear 57 adapted to mesh with a gear 58 on the shaft 59 of pinion 49. The third arm of the train comprises bevel gear 60 secured to pinion 48. In addition to or instead of employing a manual setting handle for the angle, I may employ an automatic means such as a repeater motor 61 controlled directly from a transmitter 62 on the target bearing telescope 63 (Fig. 8). Each setting handle is normally disconnected from the driving shafts 64 and 55, but may be connected therewith by pushing in on the handles against the action of springs 66 and engaging clutch teeth 67 and 68.

Preferably I provide the setting handle 51 with a lock 70 arranged to prevent rotation of gear 54 when the setting handle is not being operated. This lock may assume the form of a bell-crank lever, one arm 71 of which engages a collar 72 on the shaft of handle 51, while the other arm forms a pawl 73 adapted to engage a notched wheel 74 on shaft 55. No lock is needed for pinion 49 since repeater motor 61 will prevent the pinion turning.

The indicator 26 may be made a substantial duplicate of indicator 25 so that a detailed description is unnecessary. The following important differences should, however, be mentioned: It is convenient to have both pointers 35 and 35' point in the same direction when indicating the angles S and T and at the same time the connecting mechanism between the two indicators which combines their readings and which is hereinafter described renders it necessary that a movement imparted to the transverse slide 38' be opposite to that imparted to the slide 38, for like angles. Hence, I have shown the members 27 and 33 turned through 180° with respect to the pointer 35'. It will readily be seen that this arrangement will impart a motion to pins 40' and 41' and hence to slide 38', which is opposite to that produced by pins 40, 41 on slide 38. Also, no repeater motor is employed to introduce the angle made by the target's course with the target bearing line, since I prefer to read this angle on the protractor 14 attached to the battle tracer. Hence, in this form I provide a lock lever 70 for the pinion 49' as well for pinion 48'.

Each slide 38, 38' is provided with an outwardly extending rack bar 75 the teeth of which pinion face inwardly. A pinion 76 is journaled on a slide 77 which meshes with the teeth 78 and 79 on each rack bar. It will readily be seen that no movement will be imparted to slide 77 when the rack bars are moved equally in opposite directions but that unequal movement or movement in the same direction will move the slide on the runways 80. The movement of this slide therefore furnishes a ready indication of the rate of change of range, since its movement is proportional to the difference between the speed of each ship resolved in the direction of the target bearing line. It will now readily be seen why it is necessary to move slides 38, 38' in opposite directions when the ships turn in the same direction and thereby why the pointer 35' is reversed with respect to rotatable members 27', 33'.

Slide 77 is arranged to govern the position of a friction roller 81 (Fig. 1) on a speed cone 82, preferably through the following mechanism: The speed cone 82 is driven by a constant speed motor 83 through bevel gears 84 and 85 and a flexible coupling 86. Motor 83 also serves to rotate a friction clutch 87 (Fig. 2) as by means of a gear 88 mounted on the motor shaft, which meshes with gear 89 on shaft 90. A gear 91 also on shaft 90 serves to drive bevel gears 92 and 93 through gear 94. A pinion 95 on the shaft of bevel gear 93 drives in opposite directions gears 96 and 97, each of which carries a friction drum 98, 99, against one or the other of which a friction disc 100 is adapted to be brought into contact by electro-magnets 101, 102. Said disc 100 is journaled on a lever 103 which is pivoted at 104 and which is thrown one way or the other by the electromagnetic action of the magnets. Each of the magnets is in circuit with one or the other of contact strips 105, 106 on slide 77. A brush or trolley 107 connected in some manner to the support 108 of friction roller 81, as by the arm 109, is adapted to contact with one or the other of the contact strips and thus complete a circuit through one or the other of magnets 101, 102, as shown clearly in Fig. 8. The rotation of disc 100 is made use of to move carriage 108 and roller 81 through any suitable form of gearing, such as gear 110 on the shaft of disc 100, intermediate gearing 111, 112, 113, 113' and 114, the gear 113 being loosely mounted on the shaft of motor 83. The last named gear is secured to a shaft 115, one portion of which is provided with screw threads 116. Carriage 108 is provided with a threaded portion 117 through which the screw 116 extends. The entire carriage 108 may be supported in a slideway 118. Roller 81 is slidably but non-rotatably mounted on a squared shaft 119.

Figure 1:
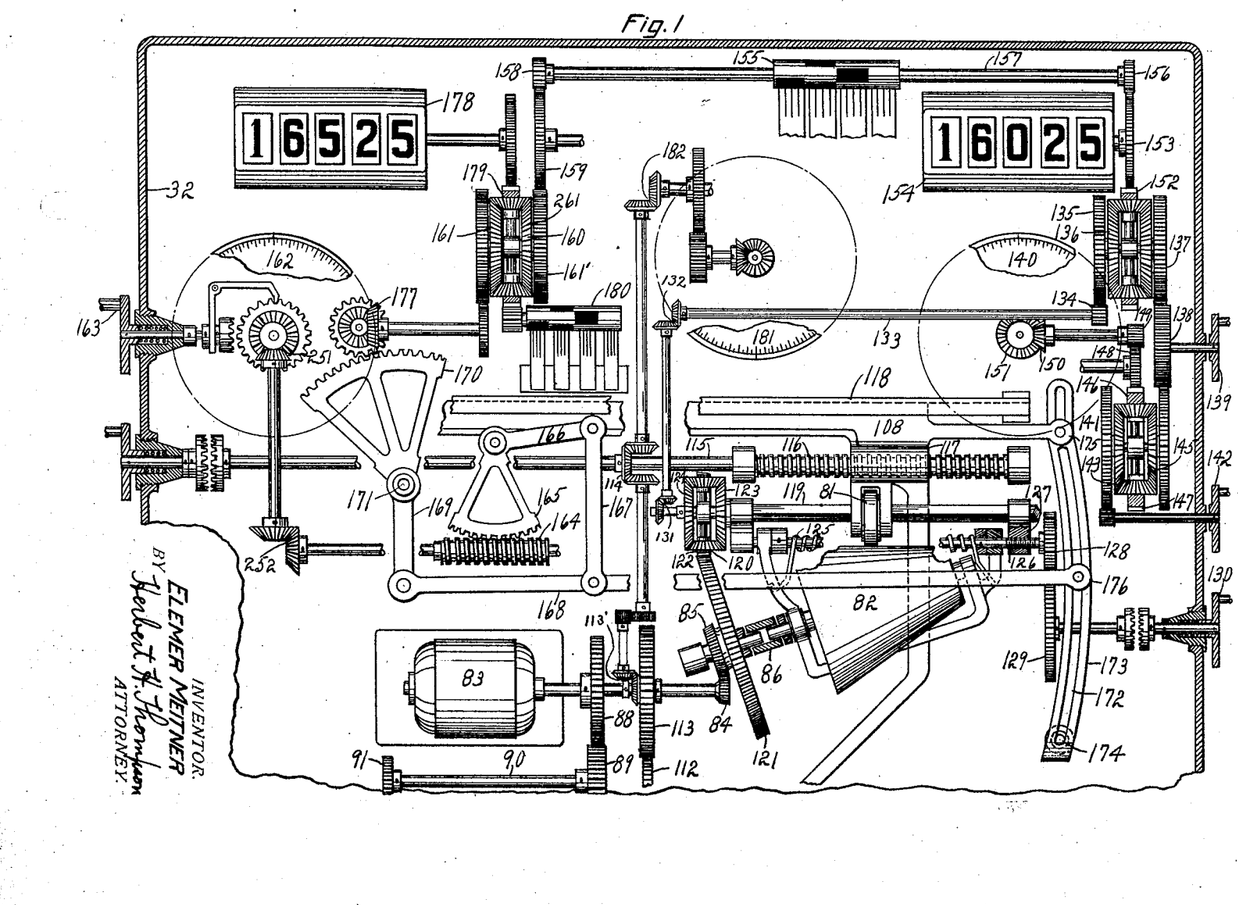
Fig. 1 is a diagrammatic view of a portion of the interior of the instrument which I term the range clock or range keeper.

I also drive from said motor 83 one arm 120 of an epicyclic train of gearing through gears 121, 122. The bevel gear 123 forming another arm of said train is mounted upon the squared shaft 119 so that rotation of the roller will rotate the bevel gear. It will hence be seen that the driven bevel gear 124 of said train will receive a motion which is the resultant of the motion of cone 82 and roller 81, so that when the roller is in the middle of the cone, gear 124 will remain at rest. A coil spring 125 may be provided to hold the cone in a closer engagement with the roller. Also means may be provided to accurately adjust the position of the cone with respect to the roller, such as a threaded shaft 126 on which the cone is suspended in a fixed bracket 127. Gears 128 and 129 are provided through which said shaft may be rotated from a handle 130. Motion of the driven bevel gear 124 is transmitted by means of gears 131 to gears 132 and thence by means of shaft 133 to pinion 134, which meshes with gear 135. One arm of an epicyclic train 136 is driven by said gear 135, the opposite arm being geared through gears 137 and 138 to a setting handle 139. Said setting handle is designed to be used both for initially setting the counter to indicate the initial range and also to introduce the spotter's correction. The amount of the spotter's correction is shown on a dial 140.

Said dial is driven indirectly from gear 138 and through another epicyclic train 141, which constitutes one means whereby the dial may be brought back to 0 after each spotter's correction is introduced. For this purpose a setting handle 142 is employed which drives the arm 143 of the epicyclic train 141. The other driving arm 145 is rotated from gear 138 while driven arm 146 drives the dial 140 through any suitable form of gearing, such as gear 147, idler 148, pinion 149 and bevel gears 150 and 151.

Returning now to the epicyclic train 136, the driven arm of said train is provided with a gear 152 which drives gear 153 on the range indicator 154. Means are provided whereby the indications of the range clock will be automatically transmitted to range indicators in the turret or in other convenient positions on the ship. For this purpose a transmitter 155 is provided which may be driven from gear 153 by pinion 156 through shaft 157. Said transmitter is designed to govern a repeater motor adapted to actuate some form of range indicator.

I also prefer to equip the range clock with means whereby a predicted range may be indicated. It will be seen that the indicator 154 will show at each instant the present probable range, or at least the range as it existed a short time before, but it is often desired to know what the range will be a predetermined interval ahead of the present, so that the guns may be trained for the future range and be fired when such a predetermined interval has elapsed. Also, since indicator 154 does not show exactly the present range but always lags a comparatively constant interval behind, due to the time taken to determine and transmit the range, it is of advantage to have a second indicator which may be set at exactly the right interval ahead to indicate the precise present range. For this purpose the rotation of indicator 154 is transmitted through shaft 157, pinion 158 and idler 159 to a gear 161' driving arm 160 of an epicyclic train 261. The opposite arm 161 is driven from a computing mechanism which will now be described in detail.

Within the range clock is placed a predicting time indicator 162 adapted to be set by handle 163, to show the time interval that is to be employed for the predicted range. Said indicator is connected by bevel gears 251, 252 with a worm shaft 164. A worm wheel sector 165 meshes with said worm and is provided with an arm 166, to which a link 167 is pivoted. Adjacent its lower end link 167 is pivoted to an intermediate portion of a long link 168. Adjacent one end link 168 is pivoted to an arm 169 forming an extension of gear sector 170 and pivoted at 171. Adjacent its other end said link is slidably mounted in a curved slot 172 of a member 173 pivoted to the casing 32 at 174. The carriage 108 is pivoted to said member 173 at 175 so that a rocking motion is imparted to said member by movement of the carriage. It will be readily apparent that the amount of motion that link 168 receives in the direction of its length is governed by the position of its end 176 in slot 172 and that the position of said end is governed by sector 165 through link 167. The motion imparted to link 168 is transmitted to gear 161 through the sector 170 and intermediate gearing 177. The predicting range indicator 178 is connected to the third arm 179 of the differential gear train 261, so that it receives motion from the present range indicating mechanism, to which is added at each instant the amount of the change of range that would take place through the time interval indicated by dial 162.

A transmitter 180 may also be connected to arm 179 so as to transmit the future range to convenient positions on the ship, as is done by transmitter 155 with the present range indications.

An indicator 181 may be employed to show the rate of change of range that is being introduced into the range clock. Such indicator is conveniently connected directly with gear 114 on shaft 115 as by means of intermediate gearing 182.

In order to furnish a ready indication of the speed of the ship, I prefer to employ in addition to or instead of the indicating dial on the battle tracer a speed indicator 183 which may be driven directly from a repeater motor 184 in circuit with a transmitter 185 driven either directly or indirectly from propeller shaft 186'.

Figure 6:
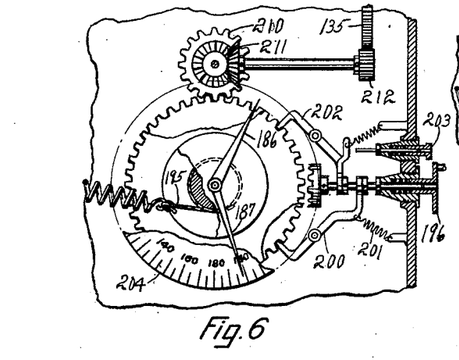
Fig. 6 is a plan view partly in section of a modified form of means for introducing the spotter's correction into the range clock.
Figure 7:
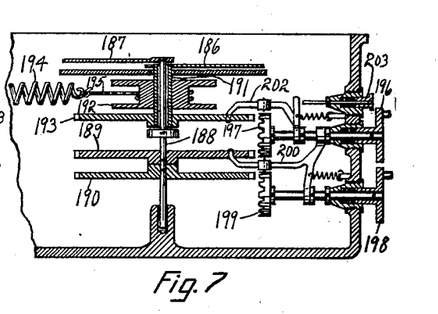
Fig. 7 is a vertical section thereof.

Instead of employing a second differential gear train 141 in order to bring the spotter's correction dial 140 back to 0 after each spotter's correction is introduced, I may employ the mechanism shown in Figs. 6 and 7 for this purpose. According to this modification, two pointers 186, 187 are used, one of which, 186, is brought back to 0 after each correction is applied while the other is not but serves to indicate the total corrections. Pointer 187 is mounted on a stem 188 to which are secured gears 189, 190. Pointer 186 is mounted on a sleeve 191 to which is secured a drum 192 and a gear 193. A spring 194 is positioned adjacent the drum and is connected thereto by a cord 195 so that the drum is normally maintained in a predetermined position by the spring and if displaced therefrom will wind up the cord 195 and bring the spring under tension. A setting handle 196 is journaled in the casing and is provided adjacent its inner end with a crown gear 197 adapted to mesh with both gears 193 and 189 and to turn them in opposite directions. A second setting handle 198 is journaled adjacent handle 196 and is adapted to turn gear 190 through crown gear 199 when desired. A pivoted lock 200 is provided for gear 189. The lock is connected with both handles 196 and 198 so that when either of them is pushed in, in order to bring its crown gears into mesh with one of the main gears, the lock is withdrawn and rendered inoperative, but as soon as the handles are released, a spring 201 throws the lock again into the operative position. A second lock 202 is provided for gear 193 and is arranged to be released by the actuation of handle 196. An additional release for said lock is provided in the form of a button 203. The operation of this modification is as follows:

The dial 204 on which the pointers read is graduated in opposite directions around its two halves, one pointer being read upon one half while the other pointer is read upon the other half. When setting the spotter's correction through handle 196, the two pointers are rotated equally in opposite directions through crown gear 197. Upon the release of said handle locks 202 and 200 operate to hold the pointers fixed. Button 203 may then be pressed so that pointer 186 will be brought back to 0. In setting the clock to the initial range, handle 198 is used, as drum 192 is not designed to be rotated through more than 180°. The motion of pointer 187 is transmitted to gear 137 of the differential train by means of a pinion 210 which meshes with either gear 189 or 190. Bevel gears 211 and pinion 212 may be used to connect the pinion with the gear 137.

The operation of the entire range clock in brief is as follows:

The indicator 25 is set to the speed of the ship through handle 51 as indicated either by counter 183 or by the dial 11 on the battle tracer, or even from the time dots 205 made by the battle tracer. The target bearing angle is preferably introduced automatically through repeater motor 61. The speed of the target is estimated from the time dots 21 as explained above and is introduced into the indicator by handle 51'. Similarly the angle T is introduced through handle 50'. The computing mechanism automatically obtains from these readings the rate of change of range and introduces it into the range clock proper through the follow-up system, including contacts 105, 106, trolley 107 and reversing clutch 87. The range clock is initially set to the range through handle 139 and automatically indicates both the present and future ranges when the indicators 25, 26 and the time dial 162 are properly set.

The future range indicator 178 has many possible interesting uses which may be found of great importance on warships. Besides being possible to use it as a future range indicator and as an exact present range indicator, as noted above, use may also be made of it to allow for variations in the deflection of the shell due to variable weather conditions, the officer in charge merely increasing or diminishing slightly the indicated predicting time to allow for increased or decreased deflection.

In accordance with the provisions of the patent statutes, I have herein described the principle of operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use. Thus the range clock calculator shown in Figures 1 and 2 may be used in other ways than as specifically described above. Instead of introducing into the calculator or computer the speed and course of both the ship and the target and obtaining therefrom the rate of change of range, the clock may be used to determine any one of the five quantities mentioned above, if the other four are known. Many times the rate of change of range is known, having been determined by either the clock or some other means, while it is very desirable to know the speed of the target. To use the clock for this purpose, the ship's course and speed, and the target's course, would be set up as before, and then the handle 51' which is adjusted for the target speed, would be turned until the dial 181, showing the rate of change of range, indicates the proper value. When this adjustment is secured the target speed will be indicated by the dial 29'.

Having described my invention, what I claim and desire to secure by Letters Patent is:

1. In a range clock, means for determining the rate of change of range comprising an indicator adapted to show the angle between the course and the target bearings, a second indicator adapted to show the speed, connecting means between said indicators for multiplying the speed by a function of said angle, a third indicator to show the angle between the target's course and the target bearings, a fourth indicator to show the target's speed, connecting means between said last named indicators for multiplying the speed by a function of said last named angle, and differential connections between said connecting means.

2. In a rate of range change calculator, a rotary speed indicator having a cam slot, a concentrically mounted rotary angle indicator having a radial slot, a laterally movable member having a longitudinal slot, a slide having pin connections with each of said slots, setting means for each of said indicators and interconnections between said setting means whereby the said speed indicator is moved conjointly with said direction indicator when the angle setting means is operated.

3. In range indicating apparatus, a rotary indicating element adapted to be set to indicate the target bearings, a rotatable indicating element adapted to be read on the first named element for indicating the speed of the ship, a slide constrained to move in a given line, interconnections between said indicating elements and slide for imparting motion to the slide, setting means for the indicating elements and interconnections between said setting means whereby the bearing setting means operates conjointly both the speed and bearing indicating elements.

4. In range indicating apparatus, a rotary pointer adapted to be set to indicate the target bearings, a rotatable dial adapted to be read on the pointer for indicating the speed of the ship, a slide constrained to move in given line, interconnections between said pointer, dial, and slide for imparting motion to the slide, a second pointer, dial and slide for similar functions of the target, interconnections between said last named pointer, dial and slide for imparting a reverse motion to the slide from that imparted to the first slide for like angles, differential means for governing a rate of change of range indicator connected to each slide and means controlled by said last named means for integrating the rate of change of range.

5. In a rate of range change calculator, a rotary speed indicator having a cam slot, a concentrically mounted rotary direction indicator having a radial slot, a laterally movable member having a longitudinal slot, a slide having pin connections with each of said slots, a second speed indicator having a cam slot, a second concentrically mounted rotary direction indicator having a radial slot both of said slots being positioned with respect to their indicators at 180° from the relative positions of the first named indicators and slots, and means interconnecting said two slides responsive only to movement in the same direction.

6. In a range clock, a pair of spotter's correction indicators a common setting handle for both indicators adapted to turn them in opposite directions, spring means for returning one of said indicators to a predetermined position, a second handle for setting the other indicator only and a lock releasable by either handle for preventing turning of said other indicator.

7. In a range clock, a pair of spotter's correction indicators a common setting handle for both indicators adapted to turn them in opposite directions, spring means for returning one of said indicators to a predetermined position, a second handle and locking means for said other indicator adapted to be released by the operation of either handle.

8. In a range clock, a pair of spotter's correction indicators, a common setting handle for both indicators adapted to turn them in opposite directions, spring means for returning one of said indicators to a predetermined position, locking means for said first indicator adapted to be released by the operation of said first handle, an auxiliary release for said means, a second handle and locking means for said other indicator adapted to be released by the operation of either handle.

9. In an ordnance device, means for determining from a plurality of known functions of a relatively moving base and target, an unknown function thereof, comprising an indicator for the speed and course of the base, a second indicator for the speed and course of the target, differential connections between said two indicators, a third indicator controlled from said connections for the rate of change of a variable function of a ship and target and means for setting any one of said indicators whereby any unknown function may be obtained when the remaining functions are known.

10. In a range change calculator, a range indicator, means for operating same comprising a computing mechanism, two independently operated spotter's correction devices for actuating said range indicator, and a dial, each of said correction devices being connected to said dial to indicate the independent setting.

11. In a range change calculator, means for computing the rate of range change, comprising means for setting up speed of ship and target bearing, means for setting up target speed and bearing, means for combining each speed with a function of the target bearing angle, means for combining the motions of said last named means, a positive driving device, and means for operating said range rate computing device from said driving device comprising gear shifting means, said shifting means being controlled by said last named combining means.

12. In a range change calculator, a range counter, rate of range change computing mechanisms, means for operating said counter through a constant speed device, variable speed mechanism controlled by said range change computing mechanism for changing the effective operation of said constant speed motor, said variable speed mechanism comprising a speed cone and co-operating roller, and means for adjusting the speed cone in position.

13. In a range change calculator, a dial, a member having a cam slot in the face thereof connected to said dial, means for adjusting said member in accordance with a speed factor, a second member adjustable in accordance with the target bearing having a radial slot, a pointer attached to said second member and positioned above the dial, a device adjustably slidable in said radial slot and having a projection positioned in said cam slot and means connected to said device to be moved in accordance with a function of the speed and target bearing angle.

In testimony whereof, I have signed my name to this specification, this 14th day of July, 1915.

Dr. ELEMER MEITNER.